United States Patent

[11] 3,619,000

[72] Inventor William P. Macarus
 Palos Park, Ill.
[21] Appl. No. 3,625
[22] Filed Jan. 19, 1970
[45] Patented Nov. 9, 1971
[73] Assignee International Harvester Company
 Chicago, Ill.

[54] ELASTIC CONNECTION BETWEEN CANOPY AND FRONT SWEEP
 5 Claims, 4 Drawing Figs.

[52] U.S. Cl. ........................................................ 296/102
[51] Int. Cl. ............................................... B62d 25/06
[50] Field of Search .......................................... 296/102;
 280/150 C, 150 B; 287/101, 96

[56] References Cited
UNITED STATES PATENTS

| 2,805,887 | 9/1957 | Selby ........................... | 296/102 |
| 3,036,858 | 5/1962 | Fingerut ....................... | 296/102 |
| 3,380,774 | 4/1968 | Brodersen ................... | 296/102 |

Primary Examiner—Leo Friaglia
Assistant Examiner—Robert R. Song
Attorney—Floyd B. Harman ABSTRACT: Attachment for a tractor comprising a canopy frame, front sweeps, and elastic joints therebetween. The rear ends of two front sweeps are connected to projecting front end portions on a sweep frame adjacent its middle legs in elastic joints each of which comprises a bolt loosely extending through openings in the end portions on the canopy frame and the rear ends of the front sweep, rubber bushings around the bolt and within the openings, and rubber washers on the bolt between the bolt head, canopy frame, front sweep, and nut on the bolt.

Inventor:
William P. Macarus
By John W. Gaines
Atty.

Inventor:
William P. Macarus

By John W. Gaines
Atty.

ELASTIC CONNECTION BETWEEN CANOPY AND FRONT SWEEP

This invention relates to improvements in a tractor attachment comprising a canopy frame and a pair of front sweeps. More specifically, the invention relates to elastic mountings for the ends of front sweeps on a canopy frame.

It is known to provide a canopy and front sweeps on a tractor for the protection of the tractor operator. The canopy over the operator keeps parts of trees or falling trees from descending on the operator when the tractor is used near or under trees. The front sweeps, connected to and ahead of the canopy, brush aside branches and foliage on the trees, for the comfort and protection of the tractor operator. The front sweeps are also subject to damage from downward impact, and trees being felled can deform or permanently deform front sweeps and can break or severely damage the connections of the sweeps to the canopy. Broken connections endanger the tractor operator. Severely damaged connections make it difficult to disconnect the deformed sweeps and replace them.

According to the present invention, elastic connections between the front sweeps and the upstanding protective canopy have been provided which are capable of rotating and moving forward when the front sweeps are deformed. Thus, tree damage to the sweeps and to the joints between the front sweeps and canopy frame is minimized. The downward impact can normally be anticipated as being made at a point on the longitudinal prolongation of the front sweep intermediate the ends thereof.

More specifically, the extensible joint of my invention anchors the longitudinal prolongation of the sweep to the upstanding protective frame and comprises: a relatively underlying supporting portion on the frame; a relatively overlying supported portion on the sweep prolongation; a bolt with head and nut disposed transversely between the underlying and overlying portions and received in registering bolt openings therein; the portions having a separation therebetween vertically spacing them apart; the portions having the registering bolt openings each appreciably oversize relative to the bolt and having separation of each portion from the respective head and nut, radially spacing apart and vertically spacing apart the portions at all points from the bolt; and intervening cushioning means in, and elastically accommodative of an appreciable change in length of, the joint without bolt breakage comprising elastomeric material in the respective spaces, first compressed between the vertically spaced-apart portions, and second compressed between the vertically spaced-apart portions and bolt head and nut, and third between the openings and bolt; the material in the first and second spaces comprising washers on the bolt and in the third spaces comprising bushings on the bolt lining the openings, effective to elastomerically compress accommodative of tilting of the bolt relative to the underlying portion during deformation by extension of the anchoring joint.

Figure 1:
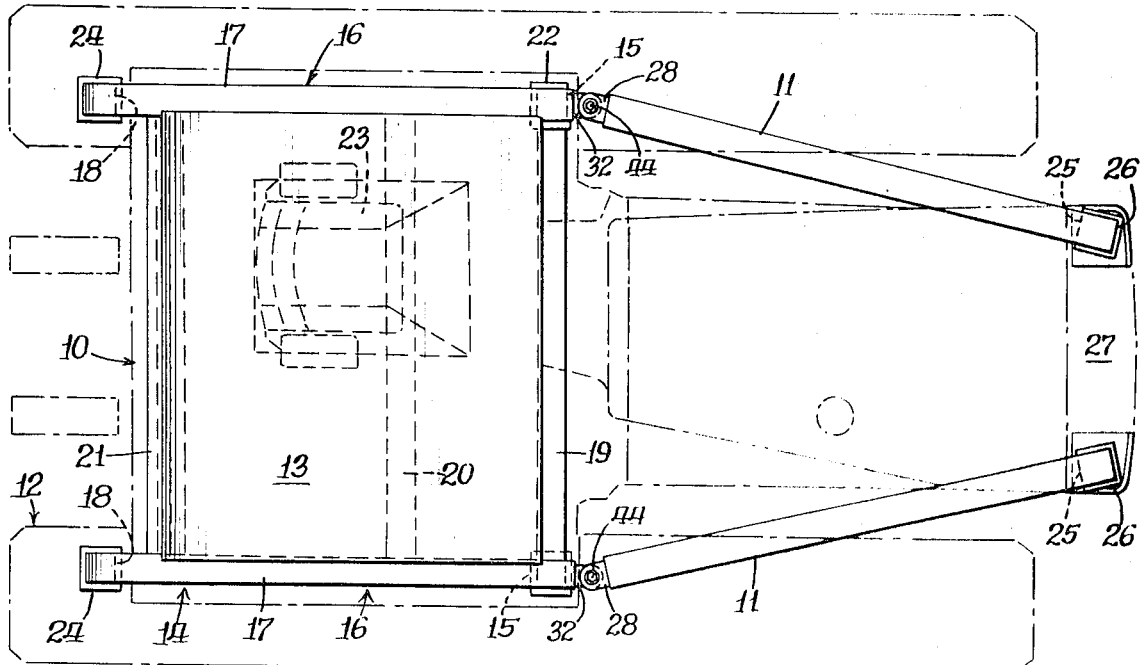
FIG. 1 is a plan view of a tractor attachment comprising canopy and front sweeps to which the novel elastic joints of the present invention have been applied.
Figure 2:
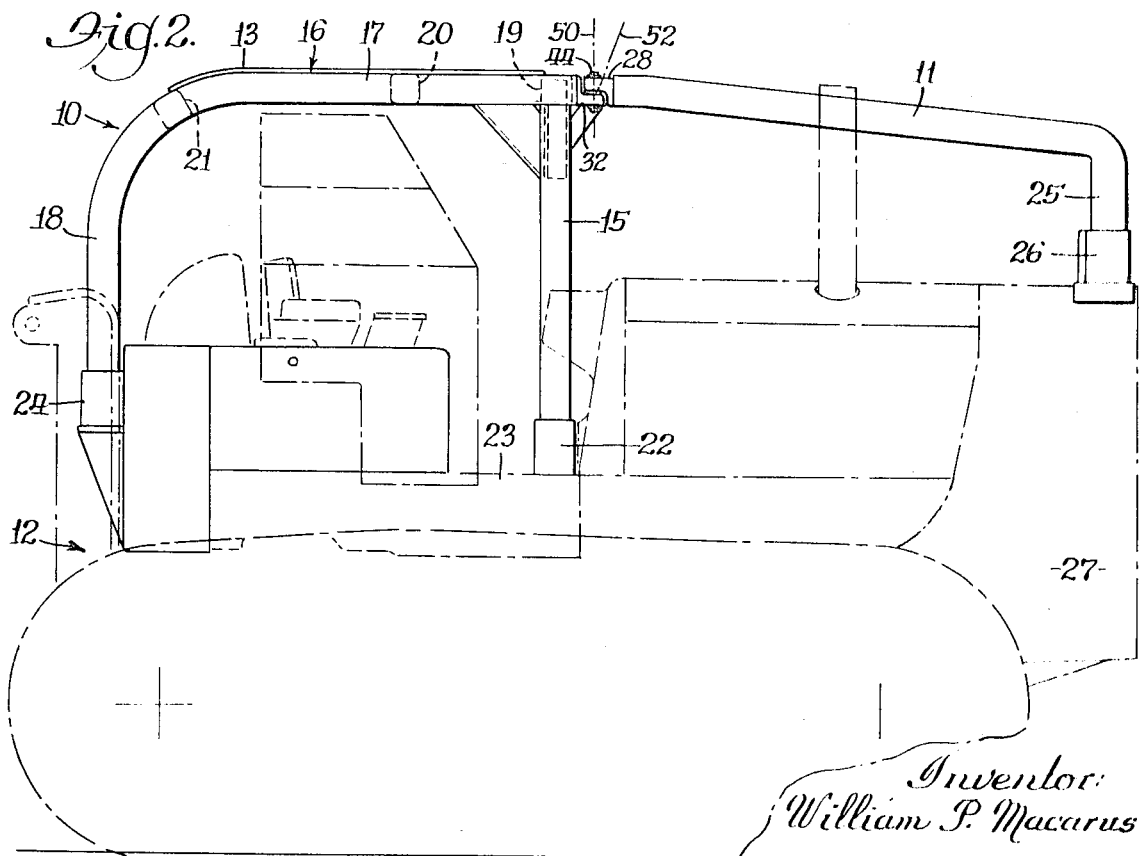
FIG. 2 is an elevational view of the tractor attachment.

As shown in FIGS. 1 and 2, an attachment comprising a canopy 10 and two front sweeps 11 is mounted on a tractor 12 which may be of the crawler type. The canopy 10 comprises a covering sheet 13 of metal and a canopy frame 14. The frame 14 comprises two middle legs 15, two rear member 16 each composed of a top portion 17 and a read leg portion 18, and front, middle, and rear crossmembers 19, 20, and 21 secured to and between the top portions 17 of the rear members 16. The front crossmember 19 is located at the juncture of the middle legs 15 with the top portions 17 of the rear member 16. The lower ends of the middle legs 15 are attached in socket members 22 secured to front corners of an operator's station 23 on the tractor 12. The lower ends of the rear leg portions 18 of the rear members 16 are attached in socket members 24 secured to rear corners of the operator's station 23. The front sweeps 11 have downwardly extending front ends 25 which are attached in socket member 26 secured to a radiator guard 27 on the tractor 12.

Except for the front ends 25, the front sweeps 11 extend generally horizontally and generally rearwardly of the tractor 12 and terminate in rear ends connected to the canopy frame 14 in an unrigid and inventive manner, as will presently appear.

Figure 4:
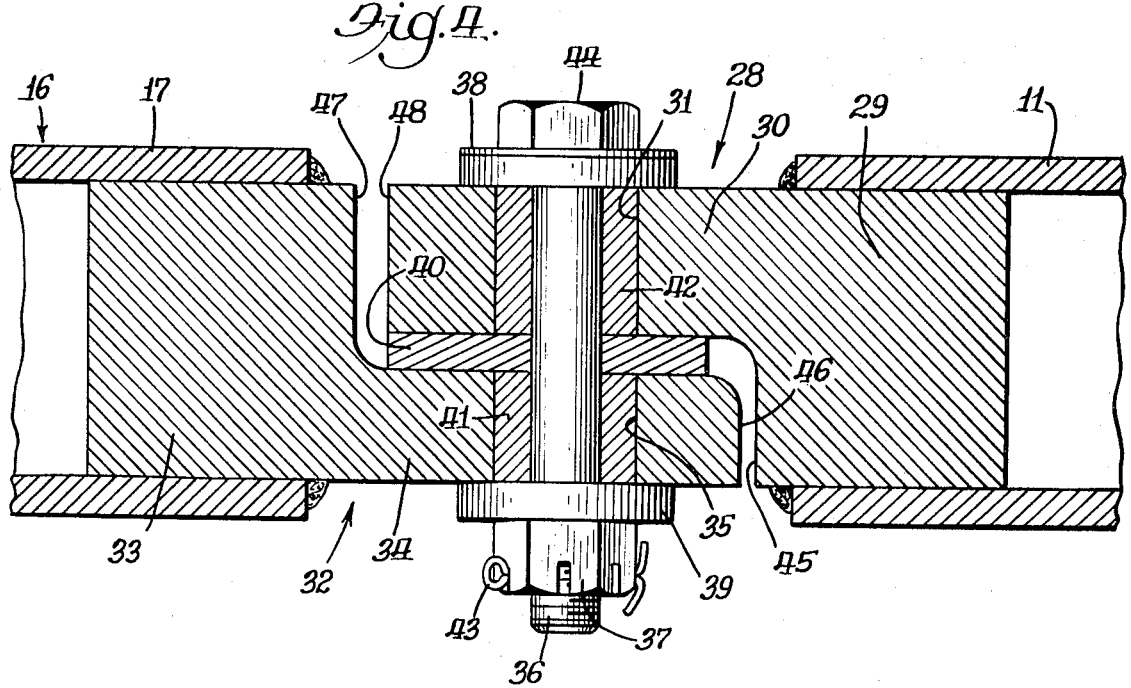
FIG. 4 is a fragmentary vertical sectional view taken on line 4—4 of FIG. 3.
Figure 3:
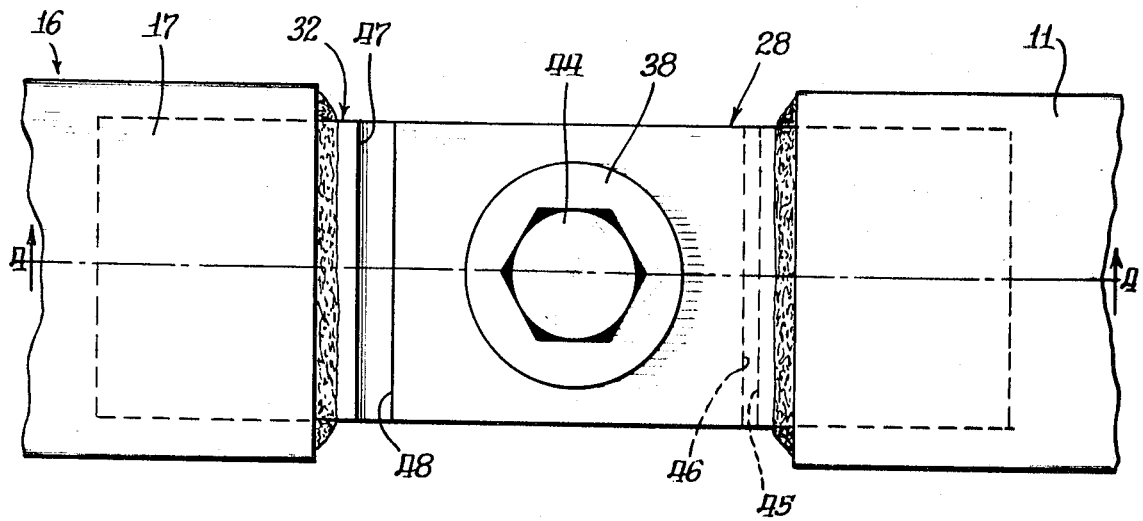
FIG. 3 is a fragmentary enlarged plan view of the elastic joints and immediately adjacent portions of the tractor attachment.

As shown in FIGS. 3 and 4, the rear end of each front sweep 11 carries an insert 28 which is secured thereto as by welding. The insert 28 is composed of a relatively thick region 29 and a relatively thin region 30, the thick region 29 being inserted in front sweep 11 and protruding slightly therefrom, and the thin region 30 being exterior to the front sweep 11 and having an opening 31. The front end of the canopy frame 14 carries two inserts 32, one insert being secured as by welding within the end of the top portion 17 of one rear member 16 just forward of the front crossmember 19, and the other insert 32 being similarly associated with the other bent member 16. The insert 32 is composed of a relatively thick region 33 located in the top portion 17 of the rear member 16 and protruding somewhat therefrom, and a relatively thin region 34 beyond the end of the top portion 17 of the rear member 16. A first separating space is linearly between the thin regions 30 and 35, and a second separating space is linearly between each thin region and the head and nut of a bolt therein, hereinafter described. The thin region 34 has a bolt opening 35, and a third separating space is annularly between the bolt opening 35 and the hereinafter described bolt therein.

The thin regions 30 and 34 of the inserts 28 and 32 overlap one another and are joined by a bolt 36, a nut 37 thereon, a pair of end washers 38 and 39 precompressed under axial pressure of the on-tightened nut 37, a central washer 40 also precompressed by the nut 37, and a pair of bushings 41 and 42. Joining the thin regions 30 and 34 in overlapping relation causes the thick region 29 of insert 29 and the front sweep 11 to be aligned with the thick region 33 of the insert 32 and the top portion 17 of rear member 16. The bolt loading is a function of the stiffness of the material of the washers and bushings. Their presence reduces fatigue loading on the front sweeps.

The washers 38, 39, and 40 and the bushings 41 and 42 are formed of rubber, multilayer rubber-impregnated cotton, or the like. One example of multilayer rubber-impregnated fabric found satisfactory is commercially available under the name Fabreeka. The central washer 40 in the first linear separating space embraces the bolt 36 and is engaged by facing sides of the thin regions 30 and 34 of the inserts 28 and 32 and by inner ends of bushings 41 and 42. The end washer 39 in the second linear separating space embraces the bolt 36 and engages the outer side of the thin region 33 of the insert 32, the outer end of bushing 41 which is in the third annular separating space, and the nut 37, which is held on the bolt 36 by a cotter pin 43. The end washer 38 embraces the bolt 36 and is engaged by the outer side of the thin region 30 of the insert 28, the outer end of bushing 42, and a head 44 on the bolt 36. A shoulder 45 formed on the thick region 29 of the insert 28 adjacent the thin region 30, faces, and is somewhat spaced from, an end surface 46 formed on the thin region 34 of the insert 32 spaced from the thick region 33. Similarly, a shoulder 47 on the thick region 33 of the insert 32 faces, and is somewhat spaced from, an end surface 48 on the thin region 30 of the insert 28.

In normal operation of the tractor, the canopy 10 prevents material from trees under which the tractor is operated from falling on the operator, and the front sweeps 11 push aside branches and foliage so as to enable the tractor operator to find his way better beneath the trees. Downward force applied against the front sweeps 11 is more readily accommodated to, as from a falling tree which would severely damage or break inflexibly bolted connections between the front sweeps 11 and the canopy 10.

With reference to FIG. 4, such downward force on the front sweeps 11 tends to draw the sweeps to the right as viewed in FIG. 4. The center of bolt tilt or rotation might be considered to lie at a lower mid region of the bolt 36 and the rotation is in the plane of the paper.

The deformability of the washers 38, 39, and 40 and the bushings 41 and 42 enables the joint to extend without undue strain and without damage to the bolt 36 holding the inserts 28 and 32 together. The space increases between the shoulder 45 and the end surface 46, attended by the bolt axis changing from the upright broken line position 50 to the forwardly tilted broken line position 52 (FIG. 2). The space between the shoulder 47 and the end surface 48 accommodates rotation of the front sweep 11.

What is claimed is:

1. An attachment for a tractor, characterized by a tilting bolt connection and comprising a canopy frame having an end portion provided with an opening, a front sweep having an end portion in a superior position vertically overlapping that of the canopy frame and having an opening epicentric to that of the canopy frame, a tiltable bolt extending freely through the vertically aligned openings in the end portions of the canopy frame and the front sweep, and having a head located at the outer side of one end portion in vertically spaced relation thereto, a nut threaded on the bolt and located at the outer side of the other end portion in vertically spaced relation thereto, and bushing and washer means mounted in the openings in the canopy frame and front sweep, embracing the bolt, and located between the bolt head and the outer side of said one end portion and between the nut and the outer side of said other end portion, the bushing and washer means being formed of rubber, rubber-impregnated cotton, or the like accommodative of tilting movement of the tiltable bolt when foreshortening of the sweep causes the connection to rotate.

2. In a vehicle,
a generally upstanding protective frame;
a front sweep for the frame with a longitudinal prolongation extending rearwardly thereto;
said frame and sweep having an extensible joint anchoring the longitudinal prolongation to the frame comprising;
a relatively underlying supporting portion on the frame;
a relatively overlying supported portion on the sweep prolongation; said portions being substantially reduced in thickness as compared to the directly adjacent regions on the frame and prolongation, so that the overall thickness where the portions overlap is no more than substantially the thickness of at least one of the directly adjacent regions aforesaid;
a bolt with head and nut, disposed transversely between and interconnecting the underlying and overlying portions;
said portions having a separation therebetween vertically spacing them apart, said portions having registering bolt openings each appreciably oversize relative to and receiving the bolt and having separation of each portion from the respective head and nut, radially spacing apart and vertically spacing apart the portions at all points from the bolt; and
intervening cushioning means in, and elastically accommodative of an appreciable change in length of, the joint without bolt breakage comprising
elastomeric material in the respective spaces first compressed between the vertically spaced-apart portions, and second compressed between each of the vertically spaced apart portions and the bolt head and nut, and third between the openings and bolt;
the material in the first and second spaces comprising washers on the bolt and in the third spaces comprising bushing means on the bolt lining the openings, effective to elastomerically compress accommodative of tilting of the bolt relative to the underlying portion, during deformation by length change in the anchoring joint.

3. An attachment for a tractor comprising a canopy frame having an end portion provided with an opening, a front sweep having an end portion overlapping that of the canopy frame and having an opening registering with that of the canopy frame, a bolt extending freely through the openings in the end portions of the canopy frame and the front sweep, and having a head located at the outer side of one end portion in spaced relation thereto, a nut threaded on the bolt and located at the outer side of the other end portion in spaced relation thereto, a first bushing mounted in the opening on the canopy frame and embracing the portion of the bolt in said opening, a second bushing mounted in the opening in the front sweep and embracing the portion of the bolt in said opening, a central washer located between and in engagement with the end portions and the bushings and embracing the bolt, a first end washer located between and in engagement with the head of the bolt, the outer side of the said one end portion, and said first bushing and embracing the bolt, and a second end washer located between and in engagement with the nut, the outer side of said other end portion, and said second bushing and embracing the bolt, the bushings and washers all being formed of rubber, rubber-impregnated cotton, or the like, the said end portion of each of the canopy frame and front sweep being substantially reduced in thickness as compared to the directly adjacent region, whereby although the end portions of the canopy frame and front sweep overlap one another, the directly adjacent regions of the canopy frame and front sweep are in alignment.

4. An attachment for a tractor comprising
a. a canopy frame comprising
 1. two middle legs,
 2. two rear members, each comprising a top portion and a rear leg portion transverse thereto, one rear member having its top portion secured to an end of one middle leg and extending transversely therefrom and its rear leg portion parallel to and spaced from said one middle leg, the other rear member being similarly associated with the other middle leg, each rear member having an end portion provided with an opening and extending from the associated middle leg in the opposite direction to the top portion of the rear member, and
 3. a crossmember having its ends attached to the rear members adjacent their junctures with the middle legs,
b. a pair of front sweeps, one front sweep having an end portion having an opening and overlapping the end portion of one rear member, the other front sweep having an end portion having an opening and overlapping the end portion of the other rear member,
c. a pair of bolts, one bolt extending freely through the openings in the end portions of said one front sweep and the associated rear member, the other bolt extending freely through the openings in the end portions of said other front sweep and the associated rear member, each bolt having a head at one end,
d. a pair of nuts threaded on the ends of said bolts opposite the heads thereof,
 one nut and the head of the associated bolt being at and in spaced relation to the outer sides of the end portions of one front sweep and associated rear member,
 the other nut and the head of the associated bolt being at and in spaced relation to the outer sides of the end portions of the other front sweep and associated rear member,
e. a first bushing and washer means mounted in the openings in the end portions of one front sweep and the associated rear member, embracing the associated bolt, and located between the head thereof and the adjacent outer side of the last mentioned end portions between the nut on the said associated bolt and the other outer side of the last mentioned end portions, and between the last mentioned end portions, f. a second bushing and washer means similarly associated with the end portions of said other front sweep, the openings therein, the associated rear member, the associated bolt, its head, and the nut on the last mentioned bolt, each of the bushing and washer means being formed of rubber, rubber-impregnated cotton, or the like, the bolts being generally parallel to the middle legs of the canopy frame, each bushing and washer means comprising first and second bushings, first and second end washers, and a central washer, each first bushing being mounted in the opening in the end portion of the associated rear member and embracing the associated bolt, each second bushing being mounted in the end portion of the associated sweep and embracing the associated bolt, each first end washer being located between and in engagement with the head of the associated bolt, the outer side of the adjacent end portion, and the associated first bushing and embracing the associated bolt, each second end washer being located between and in engagement with the nut on the associated bolt, the outer side of the adjacent end portion, and the associated second bushing and embracing the associated bolt, each central washer being located between and in engagement with the associated first and second bushings and the end portions of the associated rear member and front sweep and embracing the associated bolt.

5. An attachment as specified in claim 4, each of the said end portions of the rear members and the front sweeps having a relatively thin region and a relatively thick region directly adjacent the thin region and displaced therefrom along the rear member or front sweep in a direction toward the rest of the rear member or front sweep, the end of the thick region at the juncture of the thick and thin regions forming a shoulder spaced from the end surface of the thin region, the opening in each of the end portions of the rear member and the front sweeps being formed in said thin region, the thin region of said end portion of each rear member overlapping the thin region of said end portion of the associated front sweep, said shoulder and said end surface, respectively, of said end portion of each rear member facing and being somewhat spaced from said end surface and said shoulder of said end portion of the associated front sweep, whereby angular movement of said associated front sweep about an axis transverse to the length thereof and to the axis of the associated bolt is accommodated.

* * * * *